Jan. 19, 1965  F. PILLER  3,165,846
APPARATUS FOR DISPLAYING STACKABLE ARTICLES
Filed July 18, 1962  7 Sheets-Sheet 1
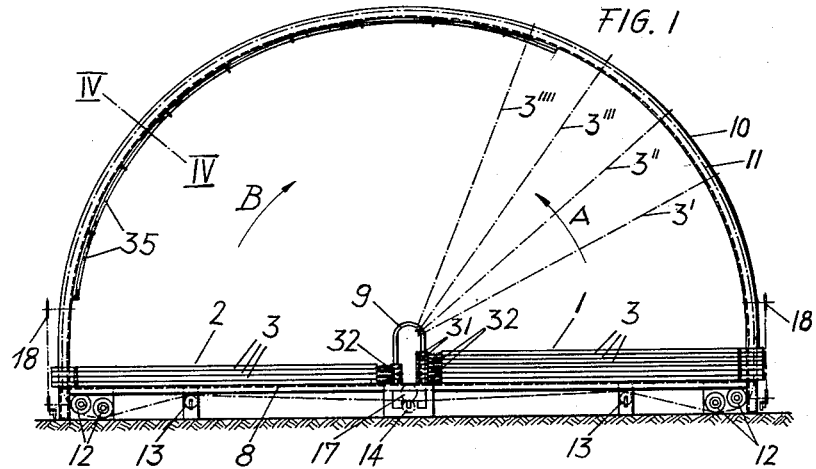
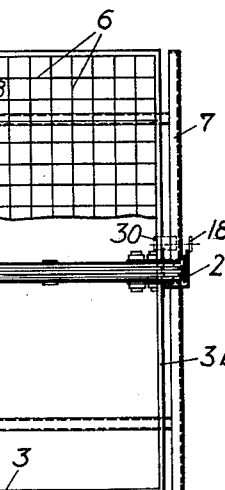
INVENTOR.
FRIEDOLIN PILLER
BY
ATTORNEYS Jan. 19, 1965  F. PILLER  3,165,846
APPARATUS FOR DISPLAYING STACKABLE ARTICLES
Filed July 18, 1962  7 Sheets—Sheet 2
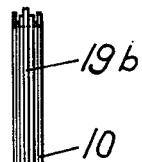
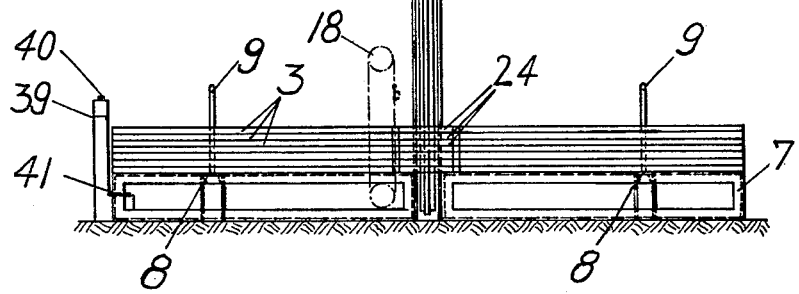
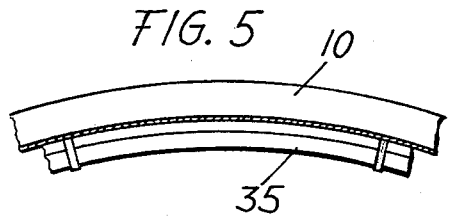
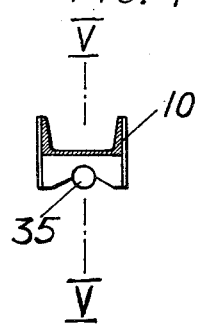
INVENTOR.
FRIEDOLIN PILLER
BY
ATTORNEYS

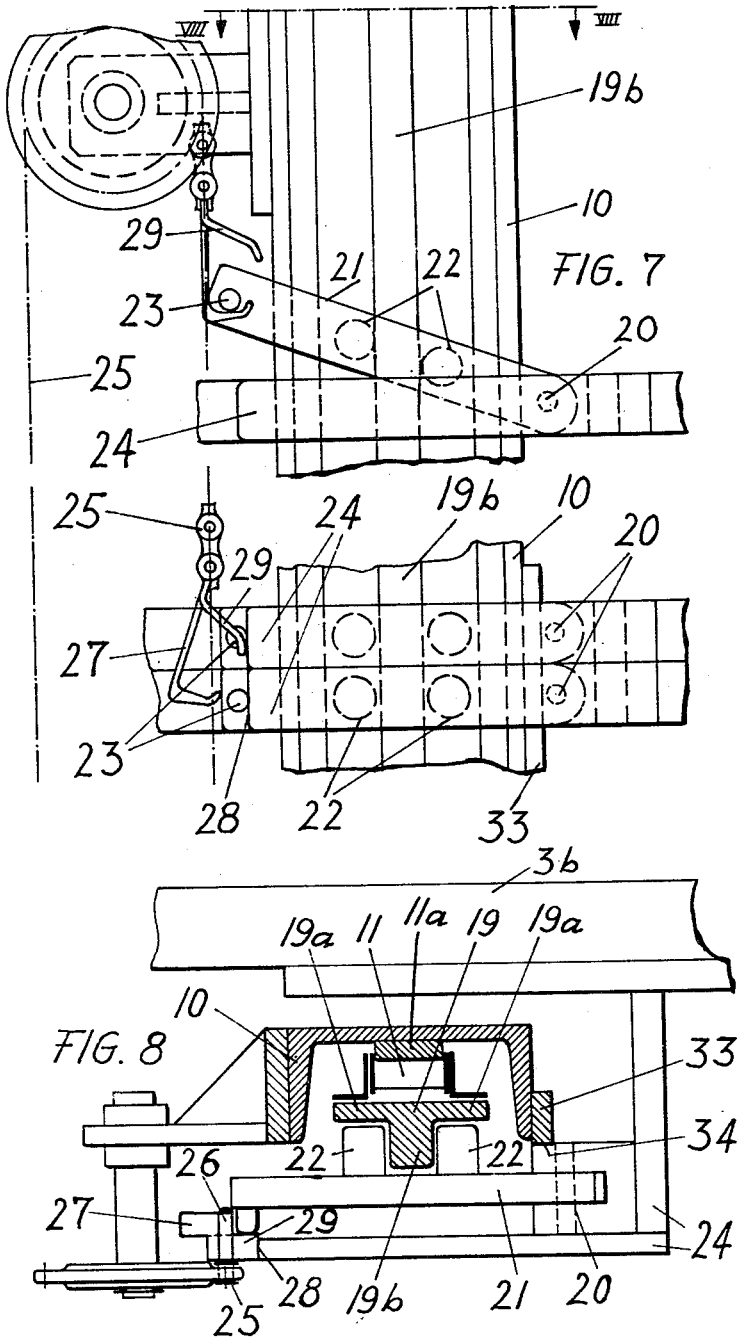

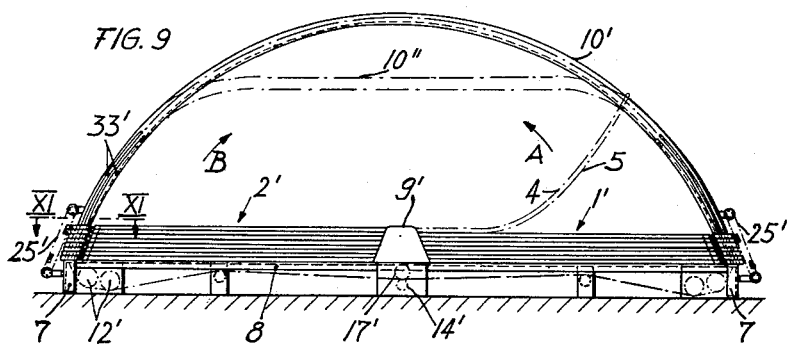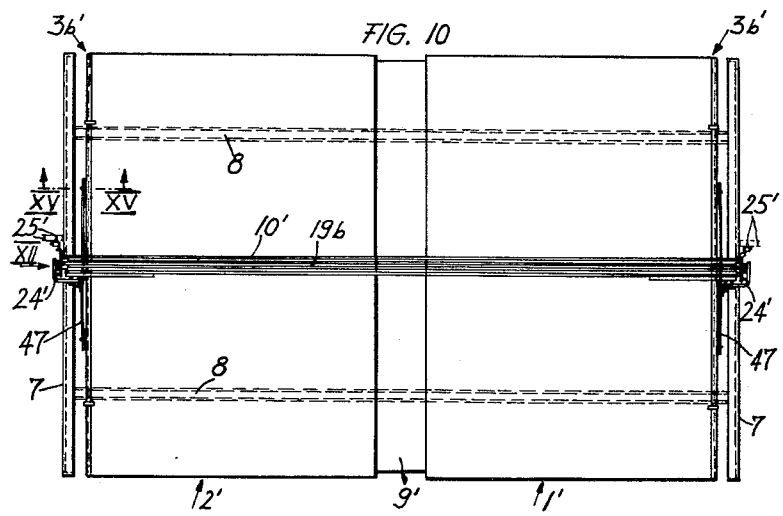

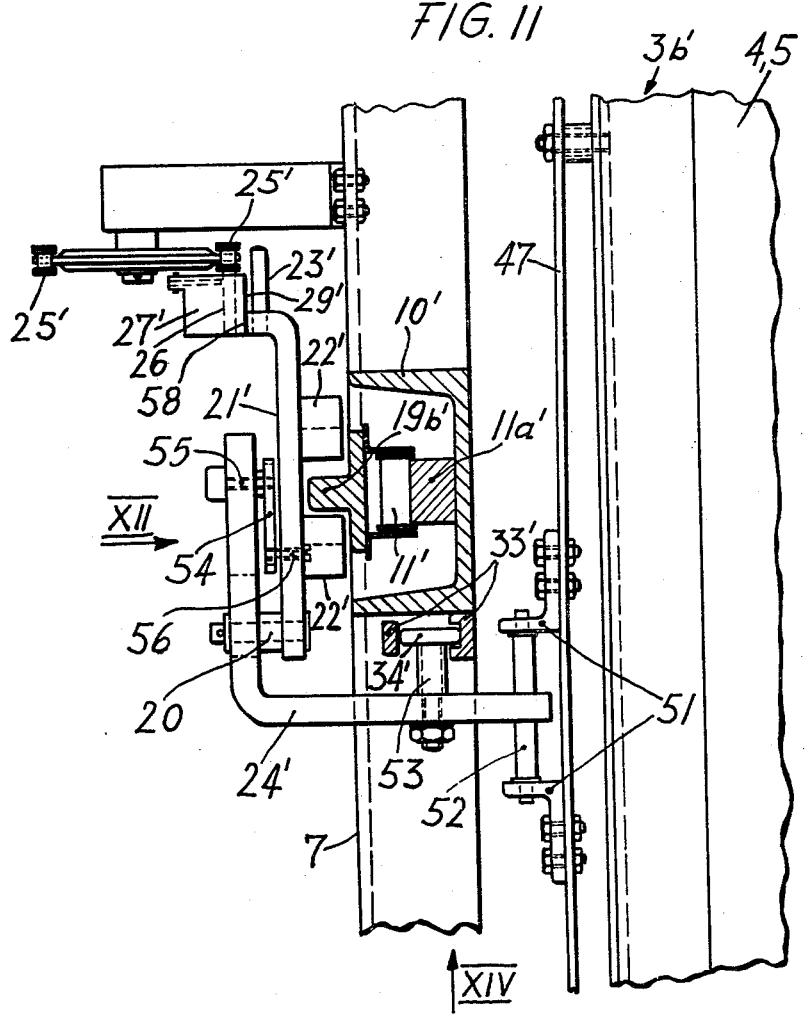

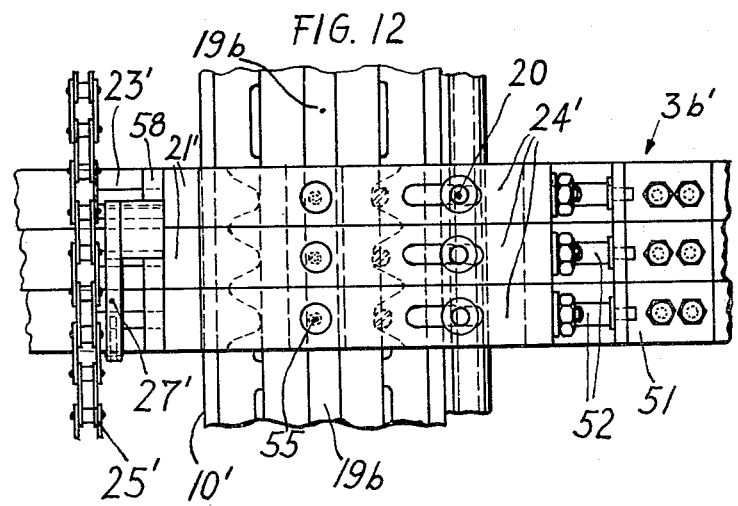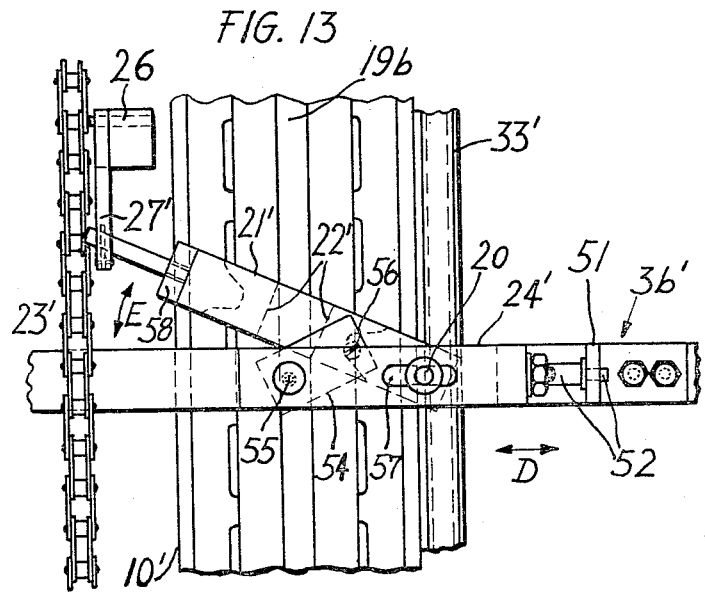

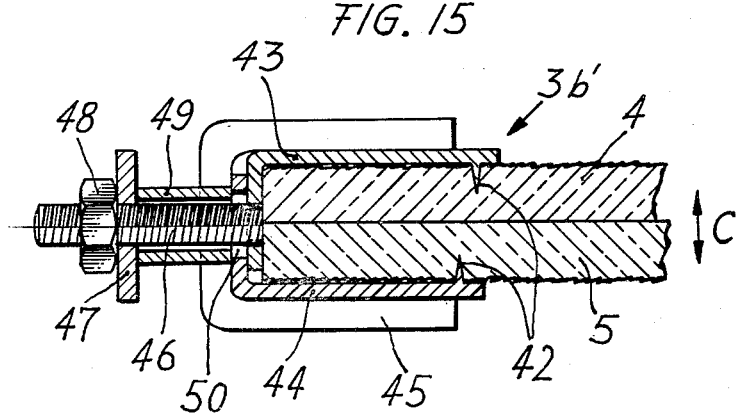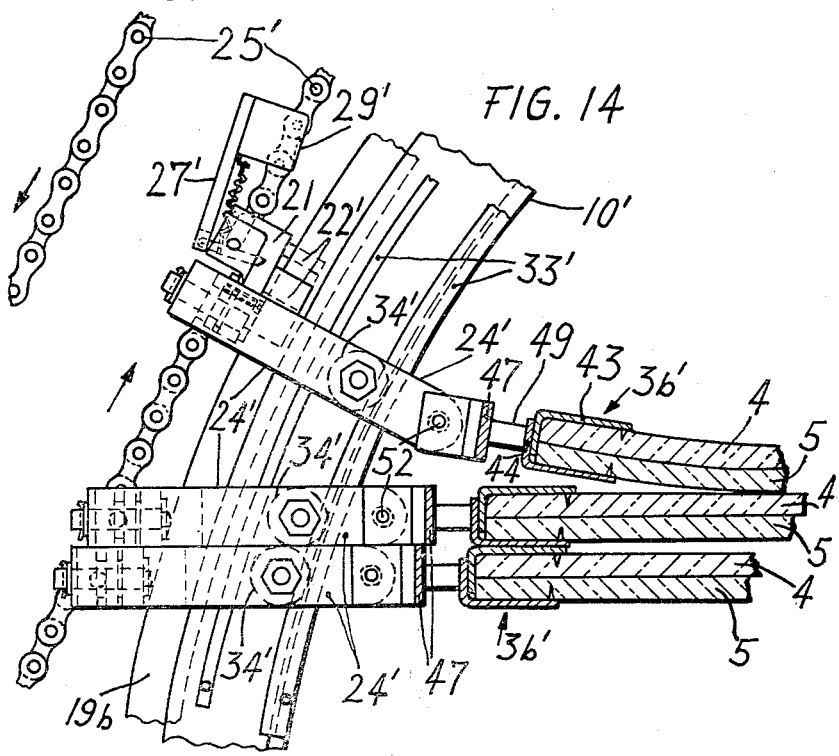

United States Patent Office 3,165,846
Patented Jan. 19, 1965

3,165,846
APPARATUS FOR DISPLAYING STACKABLE ARTICLES
Friedolin Piller, Barthshof 5, Augsburg, Germany
Filed July 18, 1962, Ser. No. 210,770
Claims priority, application Germany, July 20, 1961,
P 27,562
11 Claims. (Cl. 40—104)

This invention relates to an apparatus for displaying stackable articles, such as carpets, attached to frames, in which the frames lying on one stack are advanced one after the other and transferred to an adjoining stack.

In one known apparatus of this character for displaying carpets, the uppermost carpet on a stack is raised together with its frame by means of a slide—without turning over the carpet—and then, after being displaced through a distance equal to the width of the carpet, is deposited alongside the first-mentioned stack. This apparatus is not only of complicated construction, but also has other serious disadvantages. The transference of the carpets from one stack to the other takes a comparatively long time, since it is always necessary to transport only one carpet frame at a time, while all the other carpets remain stationary. Since moreover only one carpet is mounted in each frame, the space occupied by this apparatus is insufficiently utilized.

The above-mentioned disadvantages are overcome by the present invention.

The underlying idea of this invention is to arrange the carpets like the leaves of a book, in which these leaves are printed on both sides, and by turning them over to transfer them from one stack to the other.

The apparatus according to the invention comprises frames to each of which two carpets or other articles are secured with their back surfaces facing towards each other, a stand for supporting the two stacks of frames, at least one arcuate guide member rigidly connected to the said stand and extending over the top of both stacks, an endless pulling element which is guided on the one hand in the said arcuate guide member and on the other hand in the stand by means of rollers, a driving device for driving the said pulling element in either direction, coupling devices mounted respectively on the outer longitudinal sides of the frames and close to the pulling element, and control devices located respectively near the ends of the arcuate guide member and adapted to cause the coupling device of the frame lying on the top of one of the stacks to be brought into engagement with the pulling member, so that a transfer of the pair of carpets or other articles held by this frame takes place in a similar manner to the turning over of the leaves of a book.

This apparatus has firstly the advantage that two carpets can be secured to each frame, so that, as compared with the previously known apparatus, twice as many carpets can be displayed. The transfer of the carpet-holding frames by turning them over furthermore makes possible a quicker transfer of the carpets from one stack to the other, since it is possible for the turning-over device to engage a number of carpet frames one after the other at short intervals so that they will be transferred simultaneously.

When making use of the transfer principle according to the invention, it is further possible to arrange the frames only along the outer longitudinal sides of the stacks, i.e. only along one edge of the carpets, and to construct them in the form of straight frame members. In this way, not only is the construction simplified, but also the further advantage is obtained that the arcuate guide member can be made relatively flat or of low overall height. This makes it possible not only to install the apparatus in rooms or spaces of small overall height, but also to display carpets of large overall dimensions.

Two constructional embodiments of the apparatus according to this invention will be described in greater detail with reference to the accompanying drawings in which:

FIG. 1 is a front elevation of an apparatus for displaying carpets or the like,

FIG. 2 is a corresponding plan view,

FIG. 3 is a corresponding side elevation,

FIG. 4 is a cross-section on the line IV—IV in FIG. 1 on an enlarged scale,

FIG. 5 is a longitudinal section on the line V—V in FIG. 4,

FIG. 6 is a partial section through a carpet frame,

FIG. 7 shows part of FIG. 3 on an enlarged scale,

FIG. 8 is a section on the line VIII—VIII in FIG. 7,

FIG. 9 is a front elevation of another embodiment of the display apparatus,

FIG. 10 is the corresponding plan view,

FIG. 11 is a section on the line XI—XI in FIG. 9,

FIG. 12 is an elevation as viewed in the direction of the arrow XII in FIG. 10,

FIG. 13 is the same elevation as FIG. 12, but with the frame raised,

FIG. 14 is an elevation as viewed in the direction of the arrow XIV in FIG. 11, and FIG. 15 is a section on the line XV—XV in FIG. 10.

In the drawings, two stacks of frames for the carpets to be displayed are shown at 1 and 2 respectively, which stacks of frames are mounted on a supporting framework 7, 8. These frames are advantageously made from hollow light metal members, as shown at 3 in FIG. 6. In order to support the carpets 4 and 5 with their backings facing towards one another, a tensioned sheet 6 of wire gauze, textile material or the like is provided within each frame 3. The supporting framework on which the frames 3 are mounted consists essentially of two cross-members 7 and longitudinal bearers 8 connected to the ends of the cross-members. Between the two stacks 1 and 2 of frames 3 are fixed guide members 9, which are preferably stirrup-shaped and which, in this embodiment, are rigidly connected to the longitudinal bearers 8. These guide members serve for guiding the inner side parts 3a of the frames 3 while they are being turned over.

In the embodiment illustrated, there is provided at least one arcuate guide member 10 which is rigidly fixed to the supporting framework 7, 8 and extends over the top of the two stacks 1 and 2, as well as an endless pulling element 11 which is guided partly in the guide member 10 and partly by sprockets or rollers 12, 13 and 14 in the supporting framework. In the form shown in FIG. 8, the pulling element 11 consists of a chain which is guided by a synthetic resin guide strip 11a secured inside the arcuate guide member 10. An electric motor 15 is arranged to drive this endless pulling element via a gearbox 16 and a driving sprocket 17. The drive is arranged so that that pulling element can be driven in either of two directions at will.

On the outer side 3b of each frame, close to the pulling element is arranged a coupling clamp and furthermore there is provided close to each end of the arcuate guide member a control device 18 by which the coupling clamp of the frame which is uppermost at any time can be brought into clamping connection with the endless pulling element 11.

In the preferred embodiment illustrated, as shown in FIGS. 7 and 8, the pulling element consists of a chain driven by the driving sprocket 17 and having secured to it a profiled synthetic resin conveyor strip 19 which cooperates with the coupling clamps on the frames 3. As shown in the drawings, the conveyor strip 19 is of T- shaped cross-section, the flanges 19a forming the cross-piece of the T-section being connected to the links of the chain 11, while the flange 19b forming the stem of the cross-piece is arranged to cooperate with the coupling clamps. Furthermore, in this preferred embodiment, the coupling clamp on each frame has the form of a clamping lever 21 which is mounted to pivot on a horizontal pivot pin 20 and which in the inoperative position is disposed horizontally, the clamping lever 21 being provided with two clamping pins 22 located one on each side of the stem flange 19a of the conveyor strip 19. The distance between the clamping pins 22 is greater than the width of the stem flange 19a. In addition, there is arranged on each clamping lever 20 a lifting pin 23 which serves for actuating the coupling clamp by swinging the clamping lever 21 about its pivot pin 20. Each clamping lever 21 is mounted by means of its pivot pin 20 in a supporting bracket 24 fixed to the outer side 3b of the corresponding frame 3. The control means for the clamping levers 21 has the form of an endless chain 25 which is driven at a slower speed than the endless pulling element 11 and is provided on one of its link pins 26 with a pivoted hook 27. This chain 25 is guided so that it passes close to the clamping levers 21 in such a manner that it only engages and carries along with it the lifting pin 23 of the uppermost clamping lever 21. In this embodiment, moreover, both the clamping lever 21 and the bracket 24 by which it is supported are of the same thickness as the frame 3. Thus, the end parts 28 of these brackets form a vertical guideway. On each pivoted hook 27 there is provided a supporting arm 29 which is arranged to slide along this vertical guideway and which, as shown in FIG. 7 holds the pivoted hook 27 out of engagement with the lifting pins 23 of the clamping levers, until, after passing the bracket 24 which carries the uppermost clamping lever, the said hook is free to swing down under its own weight and thus engages the uppermost clamping lever, as shown in FIG. 7. The hook 27 causes the clamping lever 21 to pivot about its pivot pin 20 in such a manner that the two clamping pins 22 grip the stem flange 19b of the conveyor strip between them. Since the pulling element 11 runs faster than the control chain 25, the clamping lever 21 on the uppermost frame 3 and hence this frame also is carried along by the automatic gripping effect and given an arcuate movement, in the direction of the arrow A or B in FIG. 1, by which it is transferred from one stack to the other.

The speed of the control device consisting of the control chain 25, which is driven by an electric motor 30, is adjustable. The control device is arranged to be driven at two or more different speeds. By this means it is possible to cause either only one frame 3 to be transferred from one stack to the other or, in order to save time, for the frames to be transferred quickly one after the other, i.e. so that several frames are transferred almost simultaneously. In the last-mentioned case, as shown in FIG. 1 at 3', 3'', 3''', 3'''', several frames will be moving across simultaneously from one stack to the other.

In the arrangement shown in FIG. 1, slide members 31 are slidably mounted on the guide members 9, which slide members are connected by tension springs 32 to the inner sides 3a of the frames 3. The tension springs 32 exert a radial pull on the individual frames 3. As shown in FIG. 8, there is fixed to the arcuate guide member 10, which advantageously is of U-shaped cross-section, a guide bar 33 against which the frame 3 on the bracket 24 is supported in order to be able to withstand the radial pull of the spring. In this manner, it is ensured that the frames in both stacks are always precisely located so that they lie flush one on top of the other. Reliable control of the frames and of their lifting off the stacks is thus ensured. If desired, however, this result can be achieved by omitting the springs 32 and making use of other suitable guide means for the frames.

The arcuate guide member 10 serves not only for locating and supporting the pulling element 11, but can also be used at the same time as a mounting for lighting fittings 35 as shown in FIGS. 1, 4 and 5. This arrangement of the lighting fittings has the advantage that reliable illumination is obtained not only of the carpets on each of the two stacks but also of those carpets which are in course of being transferred from one stack to the other. The arcuate guide member 10 can also be utilized as a support for advertisements.

In a modification, instead of there being only one arcuate guide member 10 arranged in the middle, two arcuate guide members, each with its associated pulling element etc., may be provided.

Instead of the clamping lever 21 shown in FIGS. 7 and 8, an alternative form of clamping device may be provided which is automatically disengaged when the frame 3 carried along by the pulling element 11 is deposited on the other stack after having been swung through 180°.

The driving and control motors 15, 30 can be conveniently switched on and off by the operator or by the public by means of press button switches 40, 41 and the like on a control column 39.

The device is furthermore not restricted to being used for displaying carpets, but may also be used for displaying quilt covers, travelling rugs and the like as well as for displaying floor coverings of synthetic resin materials or the like.

A further advantageous construction according to the invention is illustrated in FIGS. 9 to 15. Since many parts of this further construction are the same as corresponding parts of the construction already described, the same references will be used for such parts with the addition of a dash. In this further construction the frames are provided only along the outer edges of the stacks and consist of straight frame members 3b'. Each pair of carpets or the like is thus held by one of these straight frame members along one edge as shown in FIG. 10, and is adapted to be transferred in the direction of the arrow A or B, as shown in FIG. 9, from one stack to the other. The use of such straight frame members 3b' has the important advantage that, as shown in FIG. 9, the arcuate guide member 10' can be relatively flat, i.e. of small overall height. The arcuate guide member 10' may, if desired, be of even smaller overall height than shown in full lines in FIG. 9 by modifying its shape as indicated in chain-dotted lines. The small overall height of the arcuate guide member in conjunction with the use of the straight frame members 3b' make it possible to provide an apparatus by means of which carpets of relatively large overall dimensions can be displayed, while at the same time the apparatus can be installed in places of small overall height.

An advantageous construction of the above-mentioned straight frame members 3b' is shown in FIG. 15. The member shown in this figure is provided with a plurality of teeth 42 which penetrate into the carpets 4, 5 to be held thereby. The frame member 3b' consists of two strips 43, 44 which are relatively slidable in the direction of the arrow C' in order to enable carpets of different thicknesses to be accommodated between them. These frame strips 43, 44 are preferably held together by clamps 45. On one of the frame strips 43 are provided screw-threaded bolts 46 which serve for securing it to a bar 47. The two frame strips 43, 44 are rigidly connected together by means of nuts 48 with interposed collars 49, and for the purpose of enabling the frame strips to be adjusted in the direction of the arrow C' a longitudinal slot 50 is provided in the strip 44. As shown in FIGS. 11 and 14 metal angles 51 are fixed to the bar 47. These provide journal mountings for a shaft 52 on which is rigidly fixed a carrier arm 24'. On one stub axle 53 carried by this arm 24' is mounted a roller 34' which engages in a guide bar 33'. The guide bars 33' corresponding to the several frames are secured, as shown in FIG. 9, on the ends of the arcuate guide member 10', so that a radial supporting of the frame members 3b' and accurate guiding of the same is ensured while they are being deposited on the stacks.

As shown in FIGS. 11 to 13, the carrier arms 24' and the clamping levers 21' are connected by a control link 54 through pivot connections 55 and 56. The pivot 20 of each clamping lever can slide in the directions indicated by the arrow D in FIG. 13 along a longitudinal slot 57 in the corresponding carrier arm 24'. Thus, free swinging of the clamping lever 21' in the directions indicated by the arrow E is made possible, without any thrust force being exerted on the carrier arm 24' and the frame member 3b' in the direction D. As shown in FIG. 11, the end of the clamping lever 21' is bent and provides at 58 a guide or abutment for the supporting arm 29' (FIG. 14) of the pivoted hook 27', which hook 27' is provided on the control chain 25' and is adapted to engage the lifting pin 23' of the uppermost frame bar 3b' and to lift it as shown in FIG. 13.

The guide means constituted by the stirrup-shaped guide member 9 of FIGS. 1 and 2, is replaced in the construction according to FIGS. 9 and 10 by a trapezoidal guide block 9' mounted on the frame members 8. This facilitates the turning over of the carpets and helps to center the inner edges of the stacks 1', 2' of carpets.

What I claim is:

1. Apparatus for displaying stackable articles, such as carpets, in a horizontal position, comprising:
   a plurality of frames each having two articles mounted thereon in parallel back-to-back relation, the frames being arranged in two vertical stacks positioned in side-by-side relation so that the stacks have mutually adjacent and remote sides and so that the frames can be moved from one stack to the other in a manner similar to the turning of pages of a book;
   a guide member extending over and crosswise of both stacks and whose ends are disposed adjacent to the mutually remote sides of said stacks;
   an endless conveying means extending along said guide member and under both stacks and means for moving said conveying means;
   coupling devices mounted on each frame at the remote sides thereof; cooperable coupling means on said conveying means, said coupling means being releasably drivingly engageable with said coupling devices so that the conveying means can convey the frames from one stack to the other, said coupling devices normally being out of engagement with said coupling means; and
   control devices mounted adjacent to both of the ends of the guide member and means for moving said control devices independently of the conveying means, each of said control devices including means releasably engageable with the coupling device on the frame on top of the adjacent stack for moving said last-named coupling device into engagement with the coupling means on the conveying means, whereby the frames can be connected to said conveying means in response to movement of said control devices and at a rate which is independent of the rate at which the conveying means moves.

2. Apparatus according to claim 1, in which the coupling devices are coupling clamps and in which the coupling means on the conveying means is a continuous strip affixed to and extending lengthwise along the conveying means, the coupling clamps being clampable to said strip at any position therealong so that the frames can be drivingly connected to said conveying means with any desired spacing therebetween.

3. Apparatus according to claim 2, in which the conveying means is a chain, and in which the continuous strip is made of a flexible synthetic resin material and is of substantially a T-shaped cross-section, the flanges forming the cross bar of the T being secured to the chain, and the flange forming the stem of the T extending away from the chain and being adapted for engagement with said coupling clamps.

4. Apparatus according to claim 2, in which the coupling clamp on each frame comprises a clamping lever which is mounted on its frame for pivotal movement about a horizontal axis, two clamping pins mounted on said lever and located one on each side of the strip, the distance between said two clamping pins being greater than the width of the strip, said lever normally being in a horizontal position extending perpendicularly to said strip, said lever being movable by said control devices to a position inclined with respect to said strip whereby said pins are moved into engagement with said strip on opposite sides thereof and at spaced apart points therealong.

5. Apparatus according to claim 2, in which a projecting lifting pin is provided on each coupling clamp for engagement by said control devices.

6. Apparatus according to claim 5, in which said control devices comprises endless elements positioned adjacent the periphery of said guide member at the ends thereof and hook means mounted on said endless elements for releasable engagement with said lifting pins.

7. Apparatus according to claim 6, in which said endless element is a chain and said hook means comprises a hook pivotally attached to one of the links of the chain, guide means for guiding said hook so that as it passes close to the coupling devices it engages and carries along with it the lifting pin on the uppermost coupling device of the stack.

8. Apparatus according to claim 7, in which the coupling clamp on each frame comprises a clamping lever which is mounted on its frame for pivotal movement about a horizontal axis, two clamping pins mounted on said lever and located one on each side of the strip, the distance between said two clamping pins being greater than the width of the strip, said lever normally being in a horizontal position extending perpendicularly to said strip, said lever being movable by said control devices to a position inclined with respect to said strip whereby said pins are moved into engagement with said strip on opposite sides thereof and at spaced apart points therealong, and in which the clamping levers are of substantially the same thickness as the frame and the ends thereof form a vertical guideway, the hook having a supporting arm which is adapted to slide along the said guideway to hold the hook out of engagement with the lifting pins until the arm has passed the uppermost clamping lever whereupon the hook springs inwardly to engage the lifting pin on the uppermost frame.

9. Apparatus according to claim 1, including guide elements mounted on said guide member and means on the remote ends of said frames engaging said guide elements whereby movement of said frames from one stack to the other is guided by said guide elements.

10. Apparatus for displaying stackable articles, such as carpets, in a horizontal position, comprising:
    an elongated supporting framework comprising a plurality of longitudinal bearers and a plurality of laterally extending cross-members;
    a guide block mounted on and extending between the longitudinal bearers approximately midway between the longitudinal ends of said framework;
    a plurality of straight frame members each having corresponding edges of two carpets affixed thereto, said carpets being mounted on said frame members in parallel, back-to-back relation, the frame members being arranged adjacent the opposite longitudinal ends of the framework so that the carpets are arranged in two vertical stacks positioned in side-by-side relation so that the mutually adjacent sides of said stacks are adjacent said guide block and the mutually remote sides of said stacks are adjacent the longitudinal ends of said framework;
    a guide member extending over and crosswise of both stacks and whose ends are mounted on said framework adjacent the longitudinal ends thereof and adjacent the mutually remote sides of said stacks, at least the end portions of said guide member being arcuate and curved toward each other;

an endless conveyor extending along said guide member and through said framework under said stacks and means for moving said conveyor;

movable coupling devices mounted on said frame members and projecting away therefrom toward said guide member;

a continuous coupling means mounted on said conveyor for movement therewith and adapted for releasable engagement with said coupling devices for drivingly connecting said coupling devices with said conveyor, said coupling devices normally being out of engagement with said coupling means;

control devices mounted on said framework adjacent the ends of said guide member and means for moving said control devices independently of said conveyor, said control devices including means releasably engageable with the coupling devices on the frame members for moving same into engagement with said coupling means.

11. An apparatus according to claim 10, in which said guide block is of trapezoidal shape with the narrow end uppermost.

References Cited by the Examiner
UNITED STATES PATENTS

| | | |
|---|---|---|
| 976,442 | 11/10 | De Lisle. |
| 1,008,245 | 11/11 | De Lisle. |
| 1,157,252 | 10/15 | Phillips et al. |
| 1,428,490 | 9/22 | Malasky. |
| 1,431,637 | 10/22 | De Lisle. |
| 1,791,355 | 2/31 | Gracey. |
| 2,577,366 | 12/51 | Reiss et al. _____ 40—36 |

JEROME SCHNALL, *Primary Examiner.*